March 7, 1933.  F. L. MORSE  1,900,192
DUPLEX LINK BELT
Filed Dec. 6, 1930

FRANK L. MORSE INVENTOR.

BY *Robert V. Morse*

ATTORNEY.

Patented Mar. 7, 1933

1,900,192

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DUPLEX LINK BELT

Application filed December 6, 1930. Serial No. 500,465.

This invention relates to link belts of the V type used in the transmission of power, and has for its principal object the production of an armored link belt of general application to all classes of drives where V pulleys are provided, including duplex or back-bend drives in which the V belt must first bend around a pulley in one direction and then bend backward in driving the next pulley. Another object is to provide an armored link belt capable of such action and having an exterior free from friction pads and other excrescences which are liable to become damaged in service. A further object is to protect the working parts both from accidental damage and also from pinching or wedging, so that the belt will run freely under all conditions of tension and alignment. Other objects are to make a link belt which can be readily manufactured in quantity production and be easily assembled or disassembled. Various other objects will become apparent as the description proceeds.

Referring now to the drawing forming part of this specification:—

Similar reference numerals refer to similar parts throughout the various views.

Figure 1:
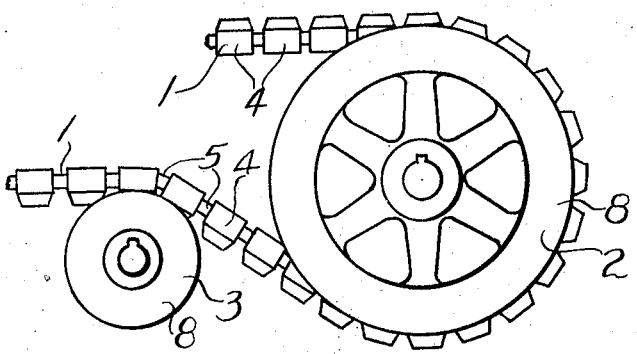
Figure 1 is a general view showing a portion of a link belt according to this invention,—passing around a V pulley in one direction and then back-bending to drive another V pulley.

Referring first to Figure 1, the link belt 1 is shown passing over the V pulley 2 and bending in one direction and then passing over the V pulley 3 and back-bending in the other direction. While only a short length of the link belt 1 is illustrated, it is understood that it is normally endless, and may pass over any number of pulleys, bending in either direction. The belt 1 is composed of friction or drive links 4 connected by interspersed tension links 5.

Figure 6:
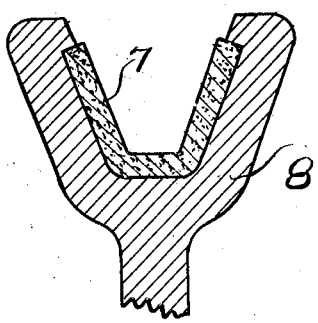
Figure 6 is a cross-section of the rim of a typical V pulley used with this type of link belt,—showing the friction lining of the V groove in the pulley.

The friction or drive links 4 are of the V type,—that is, they are adapted to run in a pulley groove having converging side walls, as shown in Figure 6 for example, and drive by frictional engagement with the side walls. The usual construction in ordinary V belts is to use smooth metal walls for the V groove of the pulley and friction material or pads for the sides of the belt, but in the preferred form of my invention illustrated I use a lining of friction material 7 in the groove of the pulley rim 8 as shown in Figure 6, and make the friction links 4 of the belt with relatively smooth hard metal exterior walls which not only make a satisfactory surface to engage the friction material 7 in the groove of the pulley, but also provide an armored metal shell 9 to enclose and protect the working joints and connecting links 5 of the link belt. This is an important feature as such belts are often exposed to severe conditions in service.

Figure 2:
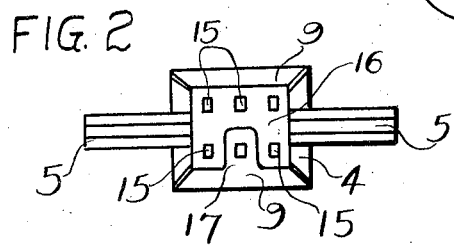
Figure 2 is a top view of one of the friction links and connecting tension links.
Figures 3, 4:
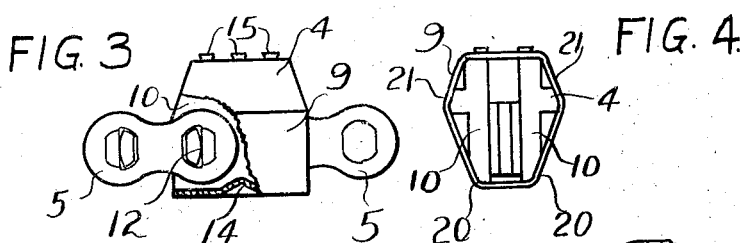
Figure 3 is a side elevation, partly in section, showing a friction link, tension links, and a typical form of rocker joint which may be used, if desired.
Figure 4 is an end view, showing the enwrapping shell, the spacing pieces, and the tension links.

Referring now to Figure 2, Figure 3, Figure 4 and Figure 5 for the detail construction of the individual links, the drive links 4 are composed in general of an external shell 9, usually made from sheet metal, which is wrapped around internal structural members 10, 10, determining its form and shape, which is generally hexagonal. A typical form of these internal structural members 10, 10, is shown in Figure 4. The structural members 10, 10 are connected to the tension links 5 thru any suitable form of pintle or joint, as for example the rocker joint 12 shown in Figure 3.

Figure 5:
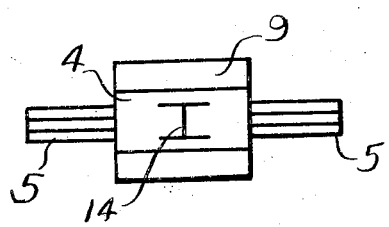
Figure 5 is a bottom view of one of the friction links and tension links,—corresponding to Figure 2 but from the opposite side.

In order that the link belt may be flexible and run freely even when the pulleys are considerably out of line, it is essential that the structural members 10, 10 shall be definitely held apart so as not to pinch the tension links 5. It will be noted that under driving tensions there may be considerable wedging or crushing forces exerted on the driving walls of the shell 9, which might tend to pinch the members 10, 10 against the sides of the tension links 5. Accordingly, the armored shell 9 is punched inward to form an indentation 14 at the bottom, as shown in Figure 3 and Figure 5, and this inwardly projecting piece of metal forms a spacing block between the lower ends of the structural members 10, 10, so that they cannot be pinched closer together at that point. To space them at the top, the structural members 10, 10 are provided with projections 15 which extend thru the upper face of the shell 9 and are riveted down when the link is assembled, thus also serving to hold the parts in place.

The ends 16, 17 of the enwrapping shell 9 are formed as shown in Figure 2 so as to abut against each other and interlock so as to resist both compressive and tensile stresses. Thus when the projections 15 are riveted down the metal shell 9 is rigidly held in place and formed about the structural members 10, 10 which are in turn rigidly braced and held apart by the transverse portions of the shell.

In order that the friction links 4 may be duplex, that is, drive with back bends as well as forward bends and still use V pulleys, the friction links 4 are provided with two sets of oppositely tapering driving faces, one pair such as 20, 20 running in the V groove of the pulley wheel 2 and the other set of driving faces 21, 21 running in the V groove of the pulley wheel 3 for example. These pairs of driving faces may have the same or different angles of slant, and also one pair may be shorter than the other, if desired, depending on the conditions of the drive. This makes the form of the driving link in general hexagonal, though not necessarily a regular hexagon.

A link belt such as described is rugged and efficient in service and due to its duplex driving face is suitable for general application to all sorts of drives, from a single two pulley drive to a drive involving any number of pulleys, with back bends as well as forward bends.

While in the foregoing I have described certain specific examples, it will be understood that they are merely for purposes of illustration to make clear the principles of the invention, which is not limited to the particular form shown, and is susceptible to various modifications and adaptations in different installations as will be apparent to those skilled in the art without departing from the scope of the invention as stated in the following claims.

I claim:

1. In a link belt for power transmission, the combination of tension links, structural members, joints connecting the tension links and structural members, and an external metallic casing having a pair of V type driving faces converging in one direction and an inverted pair of V type driving faces converging in the other direction.

2. In a link belt for power transmission, the combination of tension links, structural members, joints connecting the tension links and structural members, and an external metallic casing having a pair of V type driving faces converging in one direction and an inverted pair of V type driving faces converging in the other direction, said casing also engaging said structural members so as to act as spacing members to hold them apart.

3. In a link belt for power transmission, the combination of tension links, structural members, joints connecting the tension links and structural members, a hexagonal metallic casing enwrapping said joints and structural members, said casing having two pairs of V type driving surfaces inverted to each other so as to correspond to both forward bend and back bend drives.

4. In a link belt for power transmission, the combination of tension links, structural members, joints connecting the tension links and structural members, a hexagonal metallic casing enwrapping said joints and structural members, said casing having two pairs of V type driving surfaces inverted to each other so as to correspond to both forward bend and back bend drives, said casing being rigidly locked to the structural members both above and below the joint, so that the casing acts as spacing members to definitely hold the structural members apart from the tension links.

5. In a link belt for power transmission, the combination of tension links, structural members, joints connecting the tension links and structural members, means for spacing the structural members so that the tension links may operate freely between them, said means including V type driving elements extending in one direction and inverted V type driving elements extending in the opposite direction, whereby the link belt is adapted to both forward and back bend drives.

6. In a link belt for power transmission, the combination of tension links, structural members, joints connecting the tension links and structural members, a metal casing having duplex V driving surfaces, said casing enwrapping said structural members, and having an indentation to space the structural members.

7. In a link belt for power transmission, the combination of tension links, structural members, joints connecting the tension links and structural members, a casing having duplex V driving surfaces, said casing enwrapping said structural members and having abutting ends to which said structural members are riveted, said ends interlocking so as to resist both compression and tension stresses.

8. In a link belt for power transmission, the combination of driving members having V type friction driving faces extending in one direction and inverted V type driving faces extending in the opposite direction, so as to adapt the link belt to both forward and back bend drives, and articulated joints connecting said driving members.

In testimony whereof I have hereunto signed my name this 3d day of December, 1930.

FRANK L. MORSE.